United States Patent
Thompson

(10) Patent No.: US 10,058,761 B2
(45) Date of Patent: Aug. 28, 2018

(54) NON-COLLISION FOOTBALL AND DATA TRACKING SYSTEM

(71) Applicant: Kevin Wayne Tito Thompson, Frisco, TX (US)

(72) Inventor: Kevin Wayne Tito Thompson, Frisco, TX (US)

(*) Notice: Subject to any disclaimer, the term of this patent is extended or adjusted under 35 U.S.C. 154(b) by 0 days.

(21) Appl. No.: 15/205,000

(22) Filed: Jul. 8, 2016

(65) Prior Publication Data
US 2017/0203184 A1 Jul. 20, 2017

Related U.S. Application Data

(60) Provisional application No. 62/280,147, filed on Jan. 19, 2016.

(51) Int. Cl.
| | |
|---|---|
| *A63B 69/00* | (2006.01) |
| *A63B 71/06* | (2006.01) |
| *H04L 29/08* | (2006.01) |
| *A63B 71/02* | (2006.01) |
| *H04L 29/06* | (2006.01) |
| *H04W 4/80* | (2018.01) |
| *A63B 71/12* | (2006.01) |
| *A63B 71/14* | (2006.01) |
| *A63B 102/14* | (2015.01) |

(52) U.S. Cl.
CPC ............ *A63B 71/06* (2013.01); *A63B 71/02* (2013.01); *H04L 67/04* (2013.01); *H04L 67/12* (2013.01); *H04L 67/38* (2013.01); *H04W 4/80* (2018.02); *A63B 69/002* (2013.01); *A63B 71/12* (2013.01); *A63B 71/141* (2013.01); *A63B 2071/0625* (2013.01); *A63B 2071/0655* (2013.01); *A63B 2071/0694* (2013.01); *A63B 2102/14* (2015.10); *A63B 2208/12* (2013.01); *A63B 2220/53* (2013.01); *A63B 2220/801* (2013.01); *A63B 2220/833* (2013.01); *A63B 2220/836* (2013.01); *A63B 2225/50* (2013.01); *A63B 2225/54* (2013.01)

(58) Field of Classification Search
CPC ......... A63B 71/02; A63B 71/06; A63B 71/10; A63B 71/0605; A61B 5/01; A61B 5/103; A61B 5/746; A61B 5/4064; A61B 5/6803; A61B 5/7435; A61B 5/1114
See application file for complete search history.

(56) References Cited

U.S. PATENT DOCUMENTS

| | | | | |
|---|---|---|---|---|
| 4,660,228 A | * | 4/1987 | Ogawa | ............... A41D 19/0068 2/167 |
| 4,824,107 A | * | 4/1989 | French | ............... A63B 24/0021 273/454 |
| 5,184,831 A | * | 2/1993 | Garner | ................. A63B 69/004 200/512 |

(Continued)

*Primary Examiner* — Adnan Aziz
(74) *Attorney, Agent, or Firm* — Theodore P. Cummings, Esq.; Cummings Law, LLP

(57) ABSTRACT

The invention provides a system for playing a non-collision sport. The system comprises one or more hand devices, a jersey, shoulder pads optionally, and data collection and transfer devices. A server is part of the system and has at least one algorithm that manipulates and interprets the collected data. A data management system is connected in real-time to monitor play of the game and record and analyze player progress during game play.

19 Claims, 14 Drawing Sheets

(56) References Cited

U.S. PATENT DOCUMENTS

| | | | | |
|---|---|---|---|---|
| 6,056,674 A * | 5/2000 | Cook | A63B 71/0605 | 482/11 |
| 6,128,004 A * | 10/2000 | McDowall | G06F 3/014 | 345/156 |
| 6,997,459 B2 * | 2/2006 | von Goeben | A63B 69/004 | 273/348 |
| 7,527,568 B2 * | 5/2009 | Joseph | A63B 69/345 | 473/422 |
| 8,221,291 B1 * | 7/2012 | Kantarevic | G06F 19/3481 | 482/8 |
| 8,957,785 B1 * | 2/2015 | Matak | H04Q 9/00 | 340/870.07 |
| 2002/0037759 A1 | 3/2002 | Aldridge | A63B 69/004 | 463/1 |
| 2002/0116147 A1 * | 8/2002 | Vock | A63C 5/06 | 702/182 |
| 2003/0045357 A1 * | 3/2003 | Bishop | A63B 71/06 | 463/42 |
| 2003/0163287 A1 * | 8/2003 | Vock | A43B 3/0005 | 702/187 |
| 2003/0224685 A1 * | 12/2003 | Sharma | A41D 13/1281 | 442/304 |
| 2004/0171412 A1 * | 9/2004 | Vollmar, Jr. | A63B 69/004 | 463/8 |
| 2006/0074338 A1 * | 4/2006 | Greenwald | A61B 5/0002 | 600/549 |
| 2012/0096621 A1 * | 4/2012 | Baacke | A41D 1/005 | 2/69 |
| 2012/0214647 A1 * | 8/2012 | Ji | A63B 69/004 | 482/8 |
| 2012/0229270 A1 * | 9/2012 | Morley | A61B 5/6806 | 340/539.12 |
| 2012/0279311 A1 * | 11/2012 | Helmer | A63B 24/0021 | 73/768 |
| 2013/0060168 A1 * | 3/2013 | Chu | A42B 3/046 | 600/595 |
| 2013/0066448 A1 * | 3/2013 | Alonso | H04Q 9/00 | 700/91 |
| 2013/0167290 A1 * | 7/2013 | Ben Ezra | A63B 71/10 | 2/425 |
| 2013/0180027 A1 * | 7/2013 | Rock | A41D 19/01505 | 2/167 |
| 2013/0274587 A1 * | 10/2013 | Coza | A61B 5/6804 | 600/409 |
| 2014/0135955 A1 * | 5/2014 | Burroughs | G06F 19/3481 | 700/91 |
| 2014/0188426 A1 * | 7/2014 | Fastert | G01P 15/0891 | 702/139 |
| 2014/0343701 A1 * | 11/2014 | Song | A63B 71/06 | 700/92 |
| 2015/0148114 A1 * | 5/2015 | Morehouse | A63B 71/0605 | 463/8 |
| 2015/0157917 A1 * | 6/2015 | Gennario, Jr. | A42B 3/0433 | 700/91 |
| 2015/0182810 A1 * | 7/2015 | Thurman | A63B 43/004 | 473/570 |
| 2016/0062333 A1 * | 3/2016 | Jayaraman | G08C 17/02 | 700/11 |
| 2016/0210877 A1 * | 7/2016 | Young | G09B 5/02 | |
| 2016/0213300 A1 * | 7/2016 | Allen | A61B 5/4064 | |
| 2016/0328043 A1 * | 11/2016 | Moller | G06F 3/044 | |

* cited by examiner

NON-COLLISION FOOTBALL AND DATA TRACKING SYSTEM

CLAIM OF PRIORITY TO PROVISIONAL APPLICATION

Applicant claims priority to U.S. Patent Application No. 62/280,147 filed on Jan. 19, 2016.

FIELD OF THE INVENTION

The invention herein provides a system for playing a non-collision sport. The non-collision sport is akin to American football or similar sport in which, though person to person contact may be necessary or desired, collisions between bodies is not desired.

BACKGROUND OF THE INVENTION

At all levels of participation, American football is one of the highest grossing sports in the world. From the youth to the professional adult level, billions of dollars of revenue are generated annually for the play of America's biggest sport. American football is a high-grossing business that employs millions of participants across the United States, in Canada and, with a growing presence in Europe.

Over the last few years, concern about irreversible head injuries have come into focus. Also of concern are injuries to bones and joints due to high velocity collisions. Such concerns have threatened to derail participation at the youth level at the least. High schools and colleges, too, are currently seeking opportunities to significantly reduce the trauma that their athletes experience as a result of the high speed and high force collisions between players.

Football practices have been altered across all age groups. Head trauma related protocols have been initiated. Enforcement of these protocols has been mandated through state laws and by state sports' associations. Technology has been advanced in order to make players safer. In spite of all these efforts, head-related injuries continue and concerns, especially parental concerns, continue to rise.

Many alternatives and ideas to make American football safer have been proposed. In response to concerns about the injurious nature of football, some parents have steered their children to flag football as an alternative. Little technological advancement of non-collision based football has occurred, e.g., flag football has remained unchanged almost since its inception.

What is needed therefore is an alternative to strictly collision-based football that takes into account parental concerns of football players at the youth level. At the least, the technological advancement of football at the youth level is an important addition that, heretofore, has been ill considered by the prior art.

SUMMARY OF THE INVENTION

The invention herein provides a system for playing a non-collision sport. The system comprises a hand device fitted to the hand of a player. The hand device has at least one touch sensitive pad, a data collection module for storing generated data from at least one touch sensitive pad, and data transmission device for transmitting, a data receiving device for receiving data collected by the hand device, a server (or several) connectable to the data receiving device, and an algorithm positioned onto the server. The algorithm manipulates and interprets the data collected by the hand device. For purposes of this disclosure, discussion about one algorithm or multiple algorithms shall be discussed herein as "the algorithm".

Ideally, the hand device is a glove constructed to fit substantially about the hand of a player. The glove is preferably tight fitting and not loose enough to slip off of a player's hand. Also preferably, there at least five touch sensitive pads included within the hand device. The touch pads can be attached to the fingers of a player, a player's palm and/or the back of a player's hand. In a game like American football, a player could wear one or two gloves depending upon function of the player.

The hand device herein can be highly sensitized whereby it is constructed to comprise at least ten touch sensitive pads. In another embodiment herein, the hand device may be super sensitized to comprise at least fifteen touch sensitive pads. In a final embodiment herein, the hand device can be hyper sensitized to comprise at least twenty-five touch sensitive pads.

The hand device comprises at least one feedback device and quite possibly more than one of varying type. In one execution, the feedback device produces light. In another execution, the feedback device produces sound. In yet another execution, the feedback device produces vibration. Of course, a variation is possible in which two or three of the types of feedback discussed herein are included within one hand device.

The data transmission device operates through one of several suitable means by which to transmit data. Such transmission may be wired, through use of a flash drive transfer or by wireless means. Preferably, data transmission for the system herein occurs through wireless transmission. For example, the data transmission device transmits data through a BLUETOOTH® connection. Another means of such data transmission occurs through an radio-frequency identification (RFID) reader. Yet another data transmission means occurs through a local area network, such as a ZIGBEE® network, as but one useful example of a local area network. Of course, a wi-fi network of the kind well known by persons of skill in the art is useful in the system herein.

The data collection module of the hand device is directly connected to the data transmission device. Such connection is local and physical vis-a-vis one or more wires of connection. In practice, the data receiving device is connectable to a server (or more than one) by wireless connection. Also, the data receiving device is connectable to the server by a wired connection. Also, the data receiving device is connectable to the server via transfer connection through portable memory drives.

The algorithms used herein are multi-faceted. They are constructed to treat, organize, and decipher all data created by the system and each component (e.g., the hand device) herein. In one execution, one or more algorithms used assigns received data to a specific player, a group of players and/or a team or teams. The algorithms determine the nature of the data; i.e., which player generated it, which component generated it, location of such generation, and much more. The algorithms may also categorize the data. Ideally, the algorithms assign one or more values to the data; e.g., whether a tackle has occurred; yards of a carry; positioning of hands while blocking; player position; speed of a player (s); catch of a ball; and much more.

The system may be constructed to provide feedback to the system herein. The system comprises a hand device fitted to the hand of a player. The hand device has at least one touch sensitive pad, a data collection module for storing generated data from at least one touch sensitive pad, a data transmission device for transmitting, a data receiving device for receiving data collected by the hand device, a server (or several) connectable to the data receiving device, and an algorithm positioned onto the server. The algorithm manipulates and interprets the data collected by the hand device.

The system for playing a non-collision sport herein may also comprise a shirt for use therein. The shirt or wearable garment is fitted onto a player of the game. The shirt may be tight fitting like the well known kind of compression garments produced by companies like NIKE®, UNDER ARMOUR®, ADIDAS® and the like. The shirt comprises at least one touch sensitive pad, a data collection module, and a data transmission device. The touch sensitive pad, data collection module and data transmission device of the shirt are the same or similar to that of the hand device previously described herein. Similar to the hand device, within the shirt, at least one touch sensitive pad, the data collection module and the data transmission device of the shirt are all operatively connected to one-another.

Preferably, the shirt described herein comprises at least one feedback device and most preferably, more than one feedback device. One kind of feedback device contemplated herein produces light. Another produces sound. Another produces vibration. Still another produces some combination of light, sound and/or vibration.

When placed upon a player, the hand device and the shirt (i.e., wearable garment) operate to form a feedback loop through which data of use and activity are captured. When the system is engaged by many players, i.e., two or more, the feedback loop operates to collect data and transmit such data to a collecting source, the data receiving device.

All data collected by either the hand device or shirt may be transmitted by BLUETOOTH®, RFID reader and/or a local area network. The preferred local area network is a typified by a wife or hybrid network like a ZIGBEE® network and others like it well known by persons of skill in the art.

In both the hand device and the shirt, the data collection module is directly connected to the data transmission device of each item. The data receiving device is preferably, but not necessarily, used in common by both the hand device and the shirt. Preferably, the data receiving device is connectable to a server by one or more wireless connections. Of course, the data receiving device may also be connected to the server by wired connection. Also, the data receiving device may be connectable to the server via transferable memory, i.e., portable memory drive.

Like the hand device, there may be one or more algorithms positioned onto the data collection system of the shirt. The algorithms used herein for the shirt are multi-faceted. They are constructed to treat, organize, and decipher all data created by the system and the shirt herein. In one execution, one or more algorithms used assigns received data to a specific player, a group of players and/or a team or teams. The algorithms determine the nature of the data; i.e., which player generated it, which component generated it, location of such generation, and much more. The algorithms may also categorize the data. Ideally, the algorithms assign one or more values to the data; e.g., whether a tackle has occurred; yards of a carry; positioning of hands while blocking or tackling; player position; speed of a player(s); catch of a ball; and more.

The algorithms used for the shirt assign received data to a specific player. The algorithms may also determine the nature of the data and categorize it. Further, the algorithms may assign one or more values to the data; e.g., tackle or no tackles, right position/wrong position of hands, catch of a ball, and more. The algorithms herein may be used to provide feedback to the system herein.

BRIEF DESCRIPTION OF THE FIGURES

The various exemplary embodiments of the present invention, which will become more apparent as the description proceeds, are described in the following detailed description in conjunction with the accompanying drawings, in which.

DETAILED DESCRIPTION OF THE INVENTION

By the term "non-collision" it is meant herein a game or training in which collisions of the kind typical in American football do not occur.

By the term "non-contact" it is meant herein a game or training in which no or very little physical contact (not including incidental contact) occurs.

By the term "tackle" it is meant herein a stop in play that occurs as a result of recognized contact by electronic means of one player to another player intended to be traditionally tackled or stopped.

By the term "local area network" it is meant herein a computer network that links two or more computer related devices through wi-ti, ZIGBEE't, or any kind of wireless computer network well known by persons of skill in the art.

By the term "server" it is meant herein a server-grade computer or a server of the kind well known by persons of skill in the art in computer science and information technology.

By the term "football" it is meant herein the style of football (not soccer) played in America involving an oblong ball, football helmets, shoulder pads and the like for tackling and collisions.

Figure 1A:
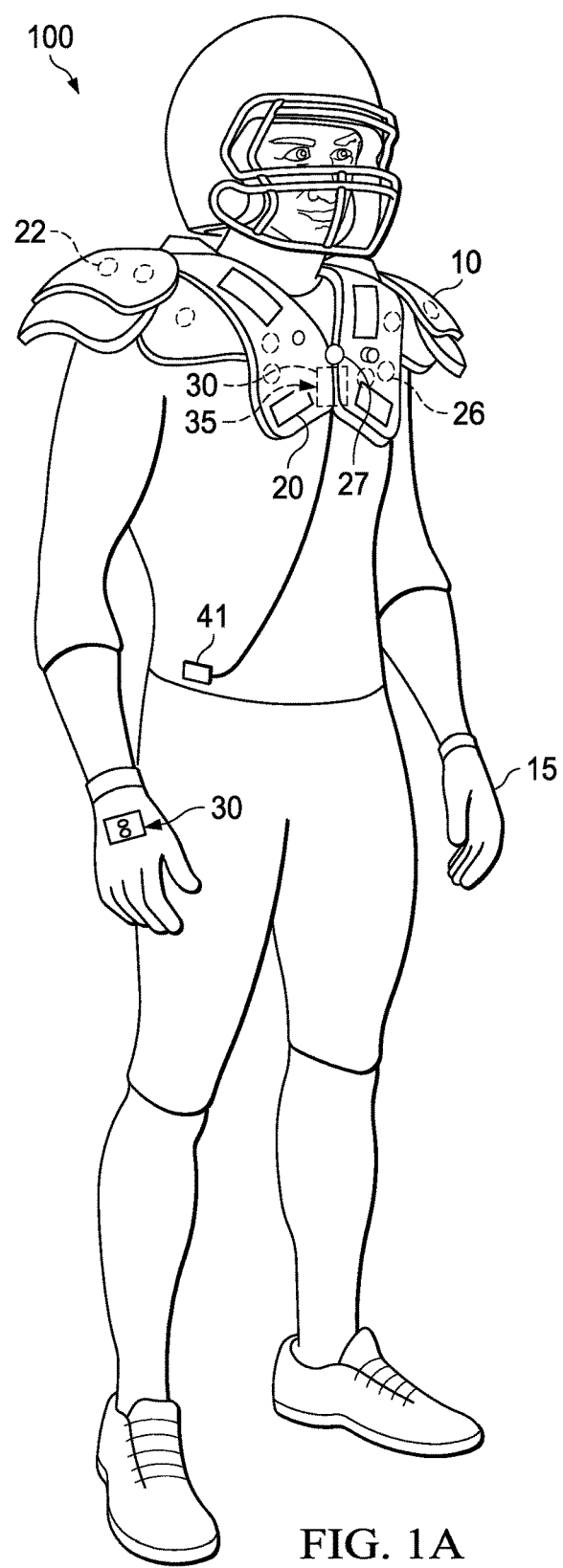
FIG. 1A is an isometric view of a sports player donning key components of the system herein.

FIG. 1A is an isometric view of a sports player donning key components of the system 1 herein. Sports player 100

(or "player 100") shown is an American football player. As shown, sports player 100 (or "player 100") dons a football helmet [5], football shoulder pads 10 and football pants [12] with pads therein. Player 100 is shown turned slightly toward the viewer. Player 100 is also shown wearing football gloves 15 (i.e., "gloves 15" or "glove 15"). Shoulder pads 10 contain much of the electronic architecture of the disclosed invention herein. Gloves 15 may contain additional electronic architecture for use in the invention herein.

Gloves 15 are shown having various electronic architecture. For example, buzzer 26 is provided. Buzzer 26 emits sound. Buzzer 26 is programmable and may be programmed to emit sound when glove 15 is touched by another player or when glove 15 touches an object (e.g., a ball, a jersey, etc.) or another player (e.g., an opposing player). The sound emits when programmable sensors on surfaces come into contact. Buzzer 26, ideally, is programmable to make a wide variety of sounds. A particular sound can be used to identify a particular event (e.g., a tackle, a catch, proper use of hands, improper use of hands, and the like depending upon what may be required for a given sport).

Light 27 may also be provided on gloves 15. Like buzzer 26, light 27 is programmable. It can be programmed to emit light of various, alternating colors whenever an event occurs and/or when an expected event does not occur. Light 27 may be responsive to touch. For example, light 27 may be operatively connected to one or more touch sensitive pads 20 or RFID tags 22. When either touch sensitive pad 20 is impacted and/or RFID tag 22 is read by an RFID reader, light 27 displays one or more lights appropriate for the nature of the contact and/or reading.

Herein, touch sensitive pads 20 may comprise either a capacitive touch sensor and/or a pressure-sensitive conductive sheet. The capacitive touch sensor comprises conductive fabric used for determining the occurrence of contact. In operation, the capacitive touch sensor provides confirmation of contact, irrespective of force of such contact. The pressure-sensitive conductive sheet is a packaging material made of a polymeric foil that is impregnated with carbon black to make it electrically conductive. When touched, the resistance in the circuit of a pressure-sensitive conductive sheet is reduced when pressure is applied. This reduction in resistance indicates when conduct is applied or removed from it.

A vibrator may be used on glove 15 in FIG. 1. A vibrator herein is preferably powered by a haptic motor. A haptic motor is a vibrating device driven by an electronic circuit. It is used herein to signal an event to a wearer of gloves 15 that an event has occurred (e.g., glove 15 has been touched; glove 15 has touched something or someone; a tackle with glove 15 has occurred; and the like). The vibrator herein may be programmed to vibrate upon contact with gloves 15. Such contact may be registered through contact with one or more touch sensitive pads 20 or reading of one or more RFID tags 22.

The electronics used in gloves 15 are housed within a module housing. The module housing is preferably a small yet durable container that protects all contained electronic architecture from normal wear and tear in game, practice and the like. What would not be considered normal wear and tear would be for a person to jump up and down on glove 15 with force and might and other actions akin thereto. Suitable materials for use in module 4 are polyethylene terephthalate, high-density polyethylene, polyvinyl chloride, low-density polyethylene, polypropylene, polystyrene, and the like. The best material for use as module 4 will be one that is durable, light, easily molded and shock resistant from outside forces.

By the term "shock resistant" it is meant herein that the material used for module 4 protects without allowing damage to the housed electronics and materials therein the in the course of normal use and wear and tear of the module within system 1.

Gloves 15 are powered by a control module. Control module is connected to all of the various other elements found within gloves 15—i.e., by wire. Data collected by gloves 15 is stored within the control module onto a data storage device (not shown). Data from the data storage device is transferrable wirelessly by one or more means discussed herein.

The control module is preferably programmable. It contains at least one central processing unit (i.e., CPU). The control module has at least one algorithm placed thereon that controls all electronic aspects of gloves 15. It may be powered by any of a number of well known CPUs by persons of skill in the art. For example, any of the CPUs made by INTEL®, AMD®, IBM®, MOTOROLA®, or APPLE® and similar manufacturers are useful for control module 4 herein. So long as such CPU is programmable by any of the standard computer languages such as SQL®, JAVA®, JAVASCRIPT®, C# ®, PYTHON®, C++ ®, SCRATCH®, and similar, the CPU for control module 4 is useful and appropriate.

Football shoulder pads 10 for use in system 1 (FIG. 8) for playing a non-collision sport herein comprises at least one touch sensitive pad 20, a data collection module (not shown); and a data transmission device (not shown). By the term "touch sensitive pad", it is meant herein any device useful capturing the happening of contact once contact is applied to such touch sensitive pad. Touch sensitive pad 20, data collection module and data transmission device of shoulder pads 10 are the same or similar to those of gloves 15 discussed further hereinbelow.

Ideally, shoulder pads 10 comprise more than one touch sensitive pad 20. As shown in FIG. 1A multiple touch sensitive pads 20 are placed liberally onto shoulder pads 10. For example, touch sensitive pads 20 are preferably placed on each shoulder portion, the front and the back of shoulder pads 10. These are not the only possible spots for placement onto shoulder pads 10. Depending upon the requirements of system 1.

Preferably, football shoulder pads 10 described herein comprises at least one feedback device and most preferably, more than one feedback device. One kind of feedback device contemplated herein produces light. Another produces sound. Another produces vibration. Still another produces some combination of light, sound and/or vibration. The term "feedback device" means a device that produces a signal to a wearer of football shoulder pads 10 and/or a person in close proximity to football shoulder pads 10 (e.g., a teammate, an opponent, a referee).

When feedback device is vibratory, such vibration is produced by one or more well known vibration sensors known in the art like a piezoelectric vibration sensor, vibration motor, vibrating mini motor disc, and the like. Companies that produce such items include PARALLAX®, DIVERSITECH®, and other such companies well known by persons of skill in the art for the production of vibration devices.

Figure 1B:
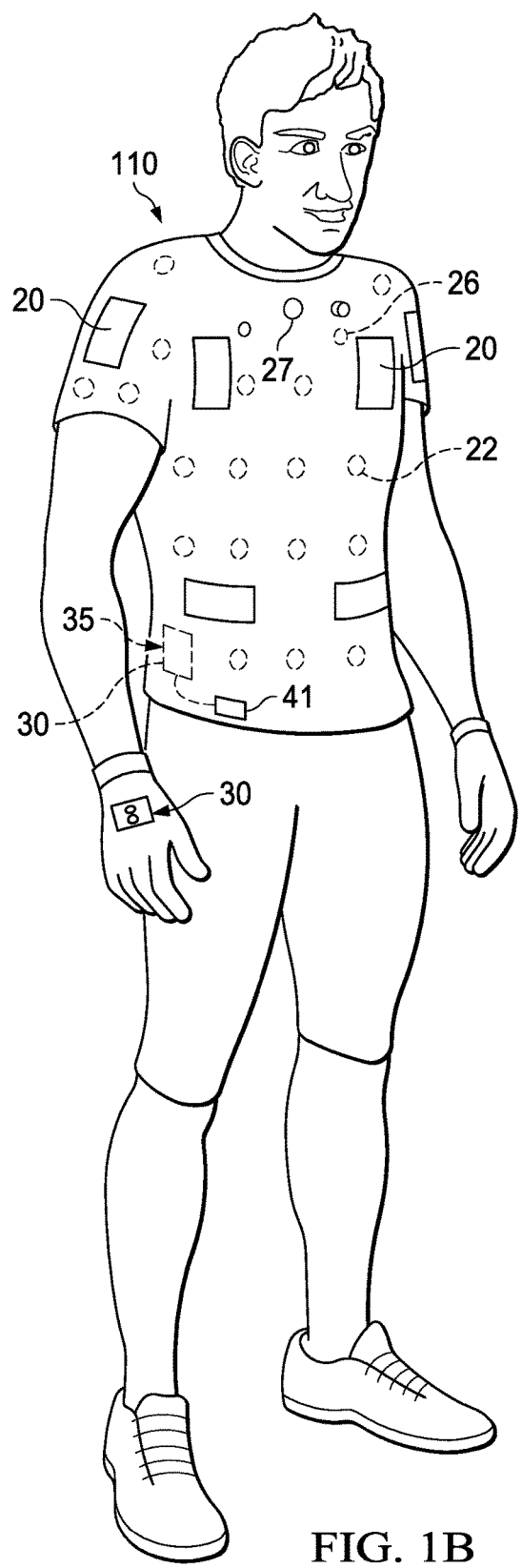
FIG. 1B is an isometric view of a sports player donning key components of the system herein.

FIG. 1B is an isometric view of a sports player donning key components of the system herein. Like sports player 100 of FIG. 1A, the sports player of FIG. 1B wears a device, jersey 110, that is integral to the system described herein. Jersey 110 comprises the same or similar electronic architecture as that of shoulder pads 10. More specifically, jersey 110 at least one touch sensitive pad 20, a data collection module (not shown), and a data transmission device (not shown). By the term "touch sensitive pad", it is meant herein any device used for capturing the occurrence of contact at the instant it applied to such touch sensitive pad. Touch sensitive pad 20, data collection module and data transmission device of shoulder pads 10 are the same or similar to those of gloves 15 discussed further herein below.

Jersey 110 can be loose fitting, similar to conventional shirts, or tightly fitted, similar to the wear of compression shirts known in the art. If tight fitting, jersey 110 is like or is similar to the compression types of shirts well known by persons of skill in the art like those made by UNDERARMOUR®, NIKE® or any of the other well known sports apparel companies. If loose fitting, jersey 110 is a jersey type of shirt used in virtually every sport played throughout the world (e.g., for basketball, cricket, soccer and the like).

Jersey 110 can be worn in any of a number sports in which physical contact is routinely made and/or in which collisions occur, either intentionally or by happenstance of play. Such sports include, but are not limited to soccer, lacrosse, basketball, baseball, cricket, rugby, American football, martial arts and more. For purposes of this disclosure, physical contact is defined as instances in which two or more persons are in physical contact with one another as happenstance of a sport played, but not when collisions of players' bodies are themselves intentional as in, for example, American football.

Ideally, jersey 110 comprises more than one touch sensitive pad 20. As shown in FIG. 1A multiple touch sensitive pads 20 are placed liberally onto jersey 110. Touch sensitive pads 20 for jersey 110 work similarly to touch sensitive pads 20 for football shoulder pads 10. Also, jersey 110 may comprise many RFID tags.

Preferably, shoulder pads 10 described herein comprises at least one feedback device and most preferably, more than one feedback device. One kind of feedback device contemplated herein produces light. Another produces sound. Another produces vibration. Still another produces some combination of light, sound and/or vibration. The term "feedback device" means a device that produces a signal to a wearer of shoulder pads 10 and/or a person in close proximity to shoulder pads 10 (e.g., a teammate, an opponent, a referee).

When the feedback device is vibratory, such vibration is produced by one or more well known vibration sensors known in the art like a piezoelectric vibration sensor, vibration motor, vibrating mini motor disc, and the like. Companies that produce such items include PARALLAX®, DIVERSITECH®, and other such companies well known by persons of skill in the art for the production of vibration devices. By the term "vibratory" it is meant herein that feedback device vibrates.

Shoulder pads 10 and jersey 110 each comprise data collection module (not shown) for storing generated data from the at least one touch sensitive pad 20, and data transmission device (not shown) for transmitting data. A data receiving device (i.e., computer game management system 205 and/or storage medium 210-FIG. 8) receives data collected by shoulder pads 10 or jersey 110. At least one server is connectable to the data receiving device (i.e., wirelessly connected or wired connection), and an algorithm (not shown) positioned onto the server, or multiple algorithms positioned on the server(s), each algorithm being responsible for various functions and the operation of system 1. The algorithm manipulates and interprets data collected by either shoulder pads 10 or jersey 110.

Figure 2:
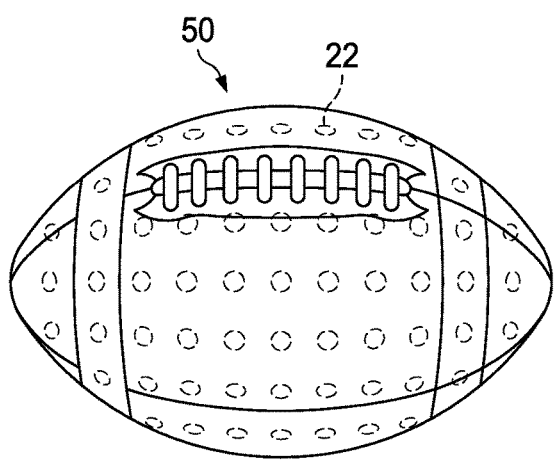
FIG. 2 is an isometric view of a type of ball used in the system for games described herein.

FIG. 2 provides an isometric view of a football 50 for use in system 1. While a football specifically is shown, persons of skill in the art will readily recognize that almost any ball is useful for system 1 herein; e.g., a baseball, soccer ball, soft ball, lacrosse ball, rugby ball, and more. The Football 50 is representative and not merely specific to American football. As shown, the football 50 comprises a multiplicity of RFID tags 22. In practice, RFID tags 22 on the football 50 are read by RFID reader 23 located in gloves 15 (See FIG. 4A).

When player 100 catches the football 50, RFID reader 23 reads RFID tag 22 thereon and notches such reading as either a) contact with the football or b) a catch of the football. RFID reader 23 may be programmed by a programmer of system 1 to help distinguish between mere contact with football versus a catch thereof. Also, RFID reader 23 may be programmed to provide time and location information of a catch. This would be particularly beneficial when the actuality of a catch is in dispute, for example, in the instance in which a ball is seemingly bobbled, caught out of bounds and the like.

Such programming would occur through one or more algorithms (not shown) that could, for example, instruct RFID reader 23 to not only read RFID tag 22 (see FIGS. 1A and 1B) but also record the length of time for such reading; i.e., the number of seconds read. This use of time by RFID reader 23 could provide a determination of what constitutes a catch. If RFID reader 23 reads RFID tag 22 for one second or less, this would constitute a non catch. If such read is two seconds or longer, this would constitute a catch. The amount of time used in this type of program is determined by a user of system 1 and for the rules of a particular game.

Figure 3:
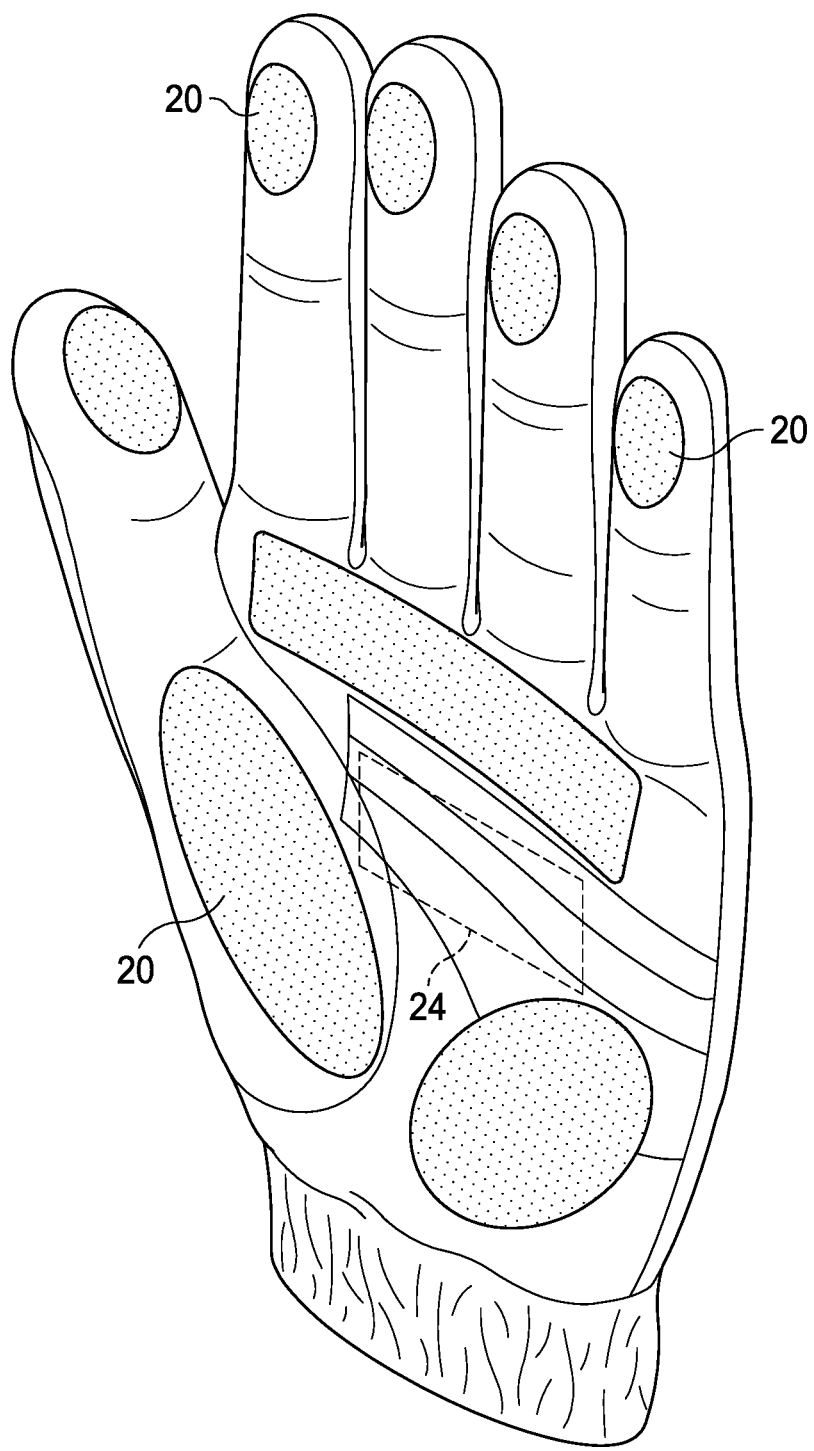
FIG. 3 is an isometric view of a hand device disclosed herein.

FIG. 3 is an isometric view of a hand device disclosed herein. Herein, the hand device are the gloves 15 shown in FIG. 1. A user's wrist is shown extending partially out of glove 15. In view herein, the bottom of glove 15 is partially turned toward the viewer. In one embodiment herein, gloves 15 are an integral part of system 1 herein. Gloves 15 have at least one touch sensitive pad 20, a data collection module for storing generated data from the at least one touch sensitive pad 20, and a data transmission device for transmitting data, a data receiving device for receiving data collected by the gloves 15, at least one server grade computer 205 connectable to a data receiving device herein (i.e., wirelessly connected or wired connection vis-a-vis a flash drive), and an algorithm (not shown) positioned onto the server, or multiple algorithms positioned on the server(s), each algorithm being responsible for various functions and the operation of system 1. The algorithm manipulates and interprets data collected by gloves 15.

Glove 15 is constructed to fit substantially about the hand of a player. Glove 15 is preferably tight fitting and not loose enough to slip off of a player's hand. Also preferably, there are at least five touch sensitive pads included within glove 15. The touch pads can be attached in the finger portion of glove 15, the palm portion of glove 15 and/or the back of glove 15. In a game like American football, a player could wear one or two gloves 15 depending upon function of the player, but preferably two gloves 15.

Gloves 15 can be highly sensitized either by construction of the materials of gloves 15 themselves and/or by use of a multiplicity of at least ten touch sensitive pads 20. In another embodiment herein, gloves 15 may be super sensitized to comprise at least fifteen touch sensitive pads 20. In a final embodiment herein, gloves 15 can be hyper sensitized to comprise at least twenty-five touch sensitive pads 20. Ideally, touch sensitive pads 20 are integral to gloves 15 and are built into the layers of gloves 15 themselves. Most ideally, gloves 15 feel like mere gloves whereby the overall construction of gloves 15 are perceived but the existence of touch sensitive pads 20 is not perceived.

Gloves 15 comprise at least one feedback device and quite possibly more than one of varying type. In one execution, the feedback device produces light. In another execution, the feedback device produces sound. In yet another execution, the feedback device produces vibration. Of course, a variation is possible in which two or three of the types of feedback discussed herein are included within gloves 15. If the feedback device produces light, such light is visible to the wearer, an opponent in close proximity and/or an observer of the sports contest.

When the feedback device is vibratory, such vibration is produced by one or more well known vibration sensors known in the art like a piezoelectric vibration sensor, vibration motor, vibrating mini motor disc, and the like. Companies that produce such items include PARALLAX®, DIVERSITECH®, and other such companies well known by persons of skill in the art for the production of vibration devices. By the term "vibratory" it is meant herein that the feedback device vibrates.

Figure 4A:
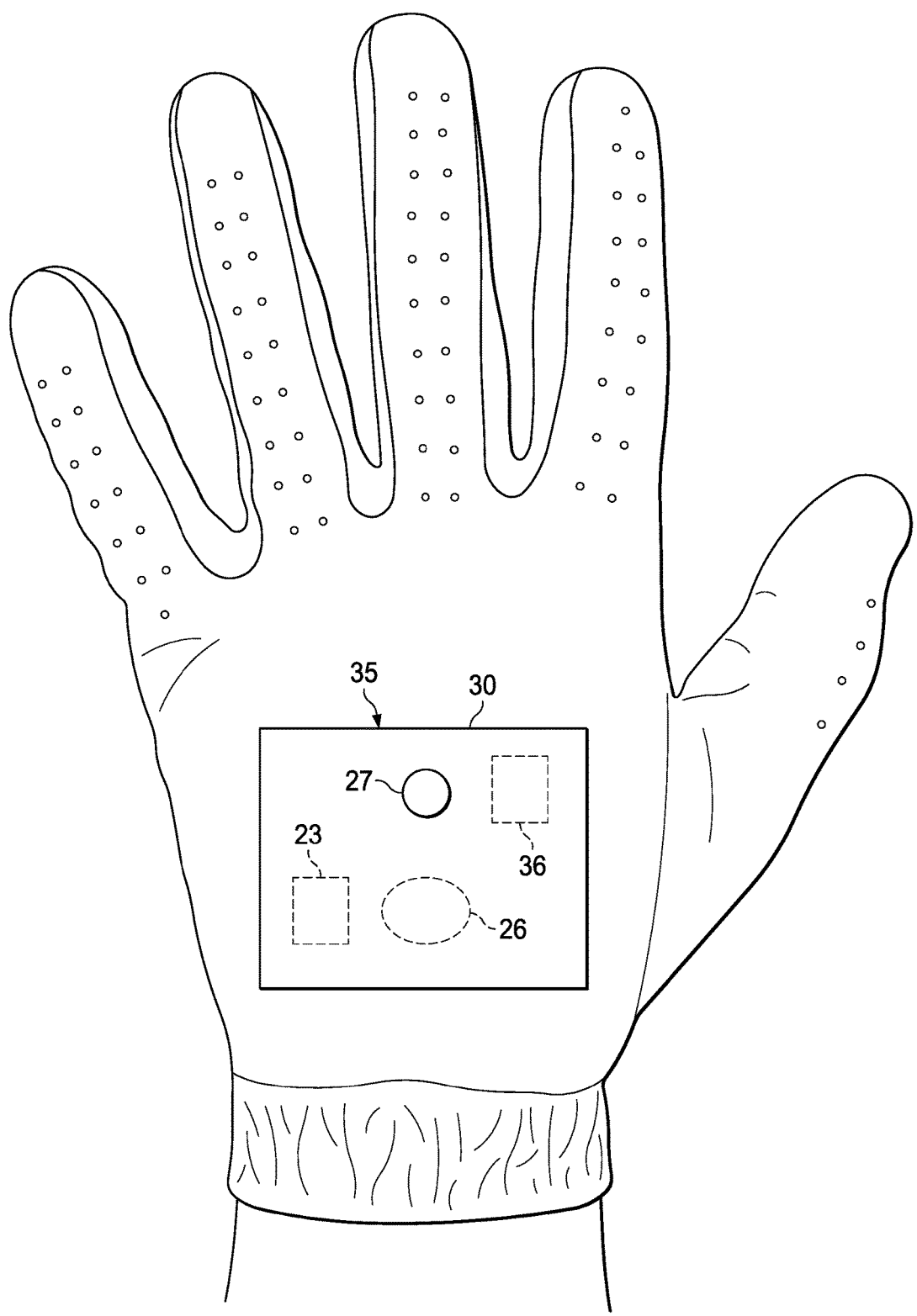
FIG. 4A is a top view of a hand device disclosed herein.

FIG. 4A is a top view of glove 15 herein. As shown module housing 30 appears below the surface of the top layer of glove 15. Ideally, module housing 30 is housed in two or more layers within glove 15 top layer. Module housing 30 contains much of the electronic architecture that operates glove 15. Module housing 30 is not meant to come into contact with a player's hand or skin.

Figure 4B:
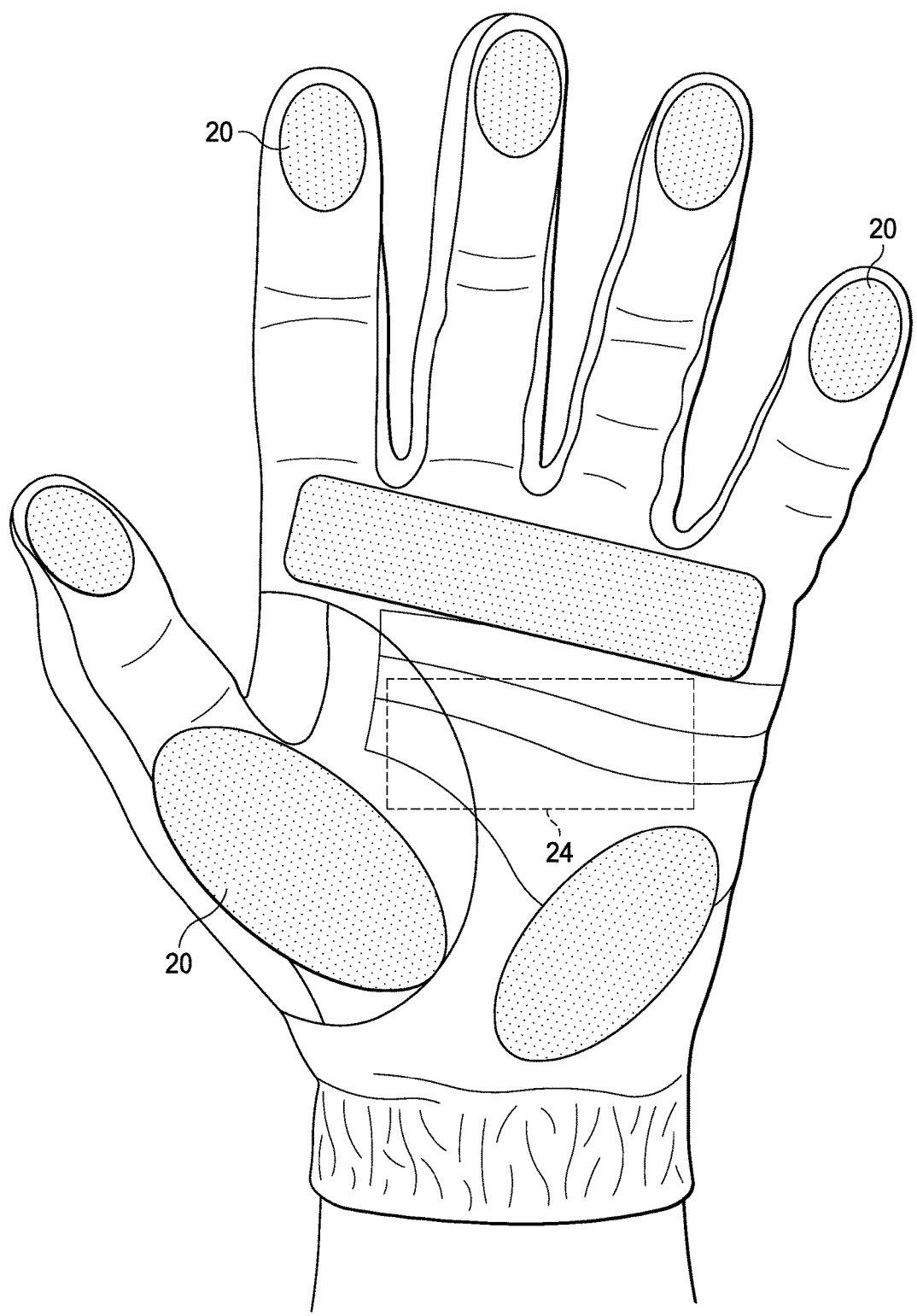
FIG. 4B is a bottom view of the hand device of FIG. 4.

Within module housing 30 are controller module 35, wireless module 36, RFID reader 23, and RFID antenna 24 (shown in FIG. 4B). Also provided are light 27 and a vibrator. Importantly, light 27 and the vibrator are operatively connected to module housing 30 but are not housed therein. By "operatively connected" it is meant herein that controller light 27 and/or a vibrator are wired to or wirelessly connected to controller module 35 and receive instructions therefrom.

Module housing 30 is shown in FIG. 4A as being of square configuration. This represents but one possibility. Module housing 30 may be of any suitable geometric configuration a designer deems necessary for proper operation of gloves 15 within system 1. Also, module housing 30 may be positioned about the palm area of glove 15. It is not, therefore, relegated to the middle of the palm area of glove 15 and can be placed elsewhere on glove 15 as is functionally necessary.

FIG. 4B shows the palm side of gloves 15 of FIG. 4A. FIG. 4B shows a plurality of touch sensitive pads 20 and RFID antenna 24. As has been noted hereinabove, touch sensitive pads 20 read and measure the pressure applied thereto, thereby confirming touch by gloves 15. RFID antenna 24 receives an RFID signal from RFID tags 22. Once received, RFID reader 23 interprets the signal received from RFID tags 22 by way of RFID antenna 24.

Ideally, touch sensitive pads 20 are spread liberally about the palm and fingers of gloves 15. They should be embedded within the layers of the palm facing surface of gloves 15. Placement of touch sensitive pads 20 is at the discretion of the designer. Such placement also depends upon the needs of a particular sport or training regimen. For example, the number and placement of touch sensitive pads 20 on a pair of, say, American football receiver gloves would be different than that needed for the gloves of baseball batter.

Figure 5A:
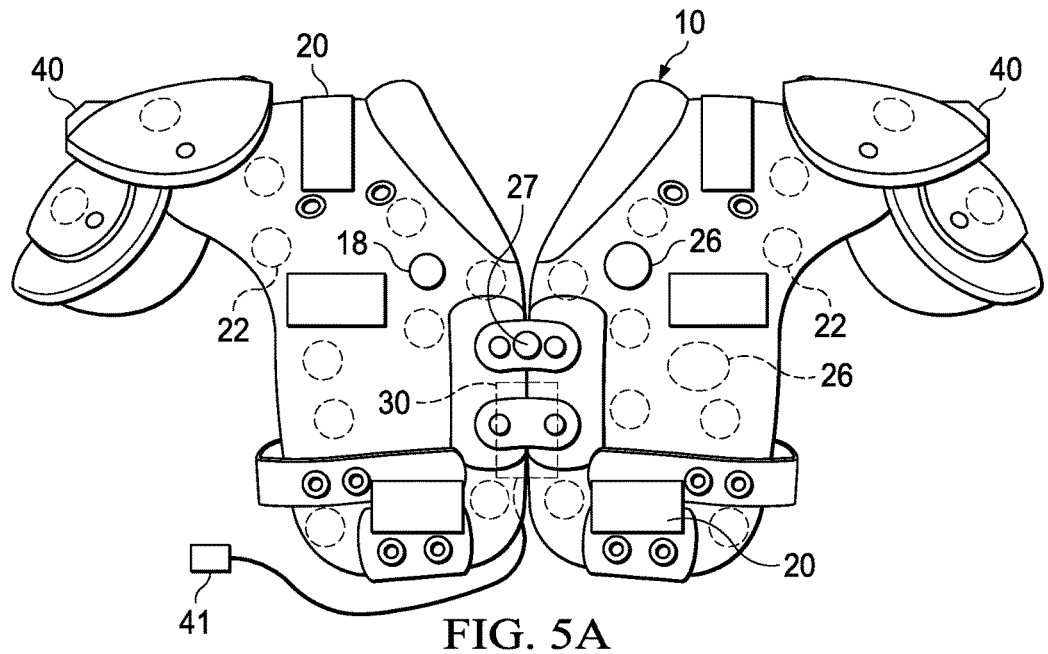
FIG. 5A is a front view of one of the types of wearable garment disclosed herein, in this case football pads.

FIG. 5A is a front view of one of the types of wearable garment disclosed herein, in this case American football shoulder pads 10 ("shoulder pads 10"). These are the kind of shoulder pads 10 well known in the art as used by players 100 who play football. Herein, shoulder pads 10 have been made a part of system 1 by which data is obtained. Shoulder pads 10 may comprise touch sensitive pads 20, RFID tags 22, one or more feedback devices like buzzer 26, light 27 and/or a vibrator. Of course, two or more of the feedback devices may be present and built into shoulder pads 10. Such feedback devices provide acknowledgment of having been contacted by an opposing player 100, such contact being counted as, for example, a tackle. Such acknowledgment occurs through programming of the system whereby use of, e.g., an RFID tag, is noted as a tackle based upon location of the RFID tag.

Also present either on or within shoulder pads 10 is module housing 30. Module housing 30 herein is similar to that for gloves 15. It contains the electronic architecture previously described; i.e., controller module 35, wireless module 36, a data collection module, and a data transmission device.

Figure 5B:
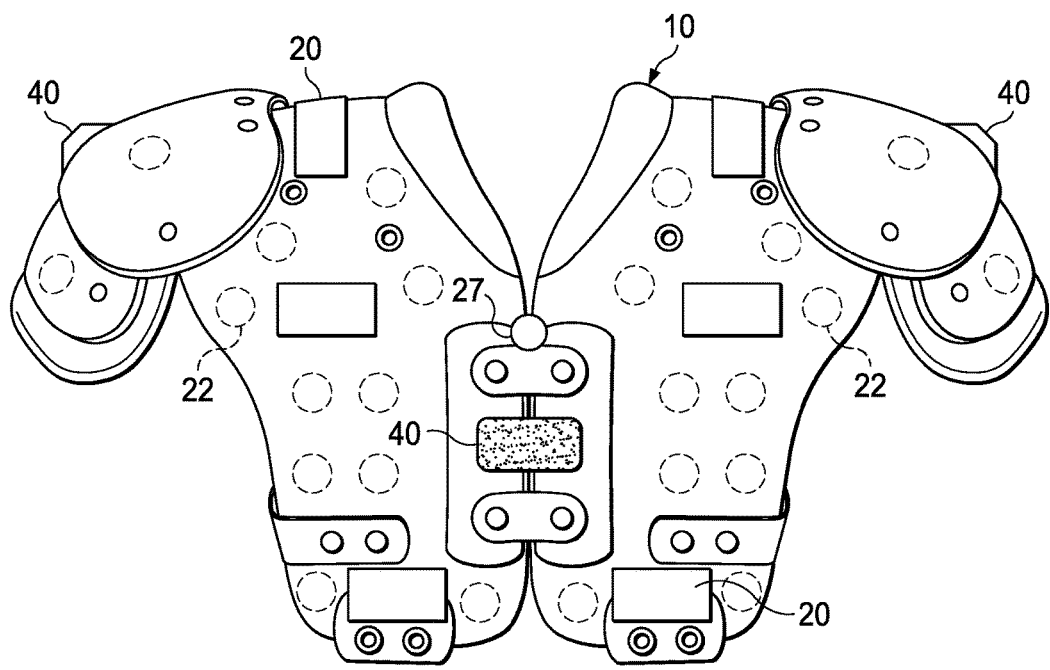
FIG. 5B is a back view of one of the wearable garment of FIG. 5A.

FIG. 5B is a back view of shoulder pads 10 shown in FIG. 5A. Touch sensitive pads 20 and RFID tags 22 are also shown dispersed about the back of shoulder pads 10. Also shown is hook & loop wiring 40 that creates an electrical connection between jersey 110 (when used herein as part of system 1) and shoulder pads 10 for touch sensitive pads 20.

Figure 6A:
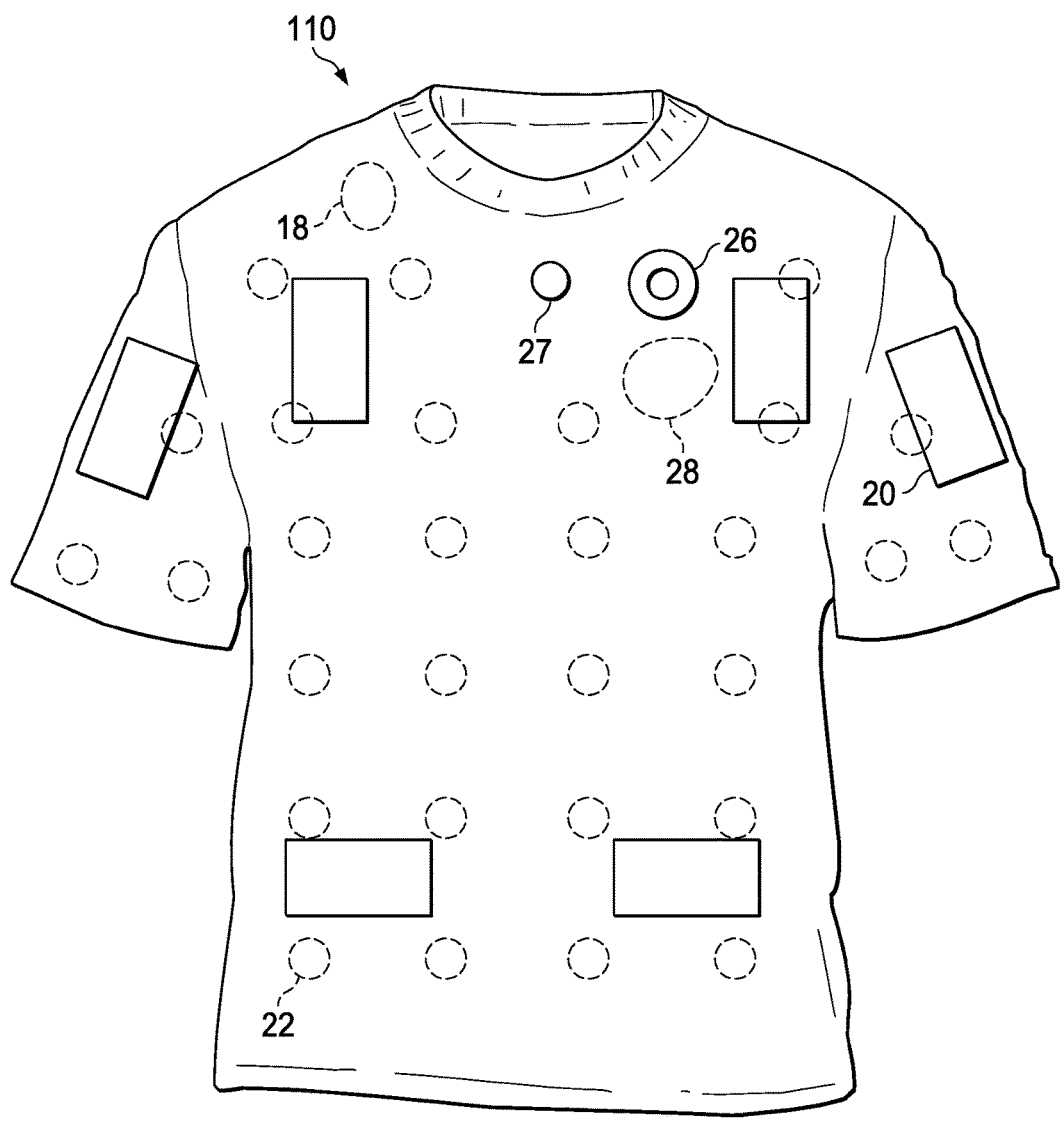
FIG. 6A is a front view of one of the types of wearable garment disclosed herein, in this instance a jersey or shirt.

FIG. 6A is a front view of one of the types of wearable garment disclosed herein, in this instance a jersey or shirt. Persons of skill in the art will understand that jersey 110 is the kind used in sports contests for various kinds of sports. It can be oversized and worn over either football shoulder pads 10 or lacrosse pads 125 (FIG. 7A) or hockey pads (not shown).

Figure 6B:
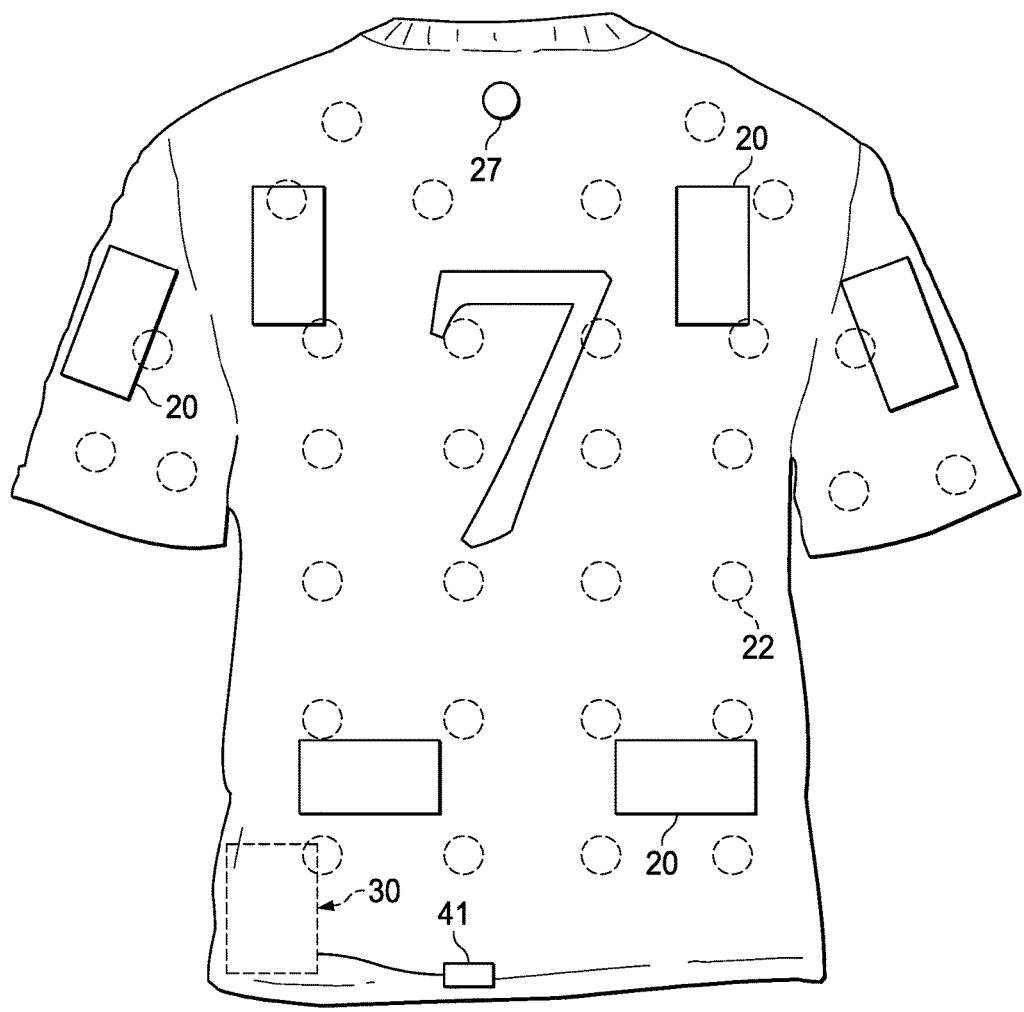
FIG. 6B is a back view of the wearable garment of FIG. 6A.

FIG. 6B is a back view of the wearable garment of FIG. 6A. Touch sensitive pads 20 and RFID tags 22 are also shown dispersed about the back of lacrosse pads 125. Also shown is hook & loop wiring 40 that creates an electrical connection between jersey 110 (when used herein as part of system 1) and lacrosse pads 125 for touch sensitive pads 20.

Figure 7A:
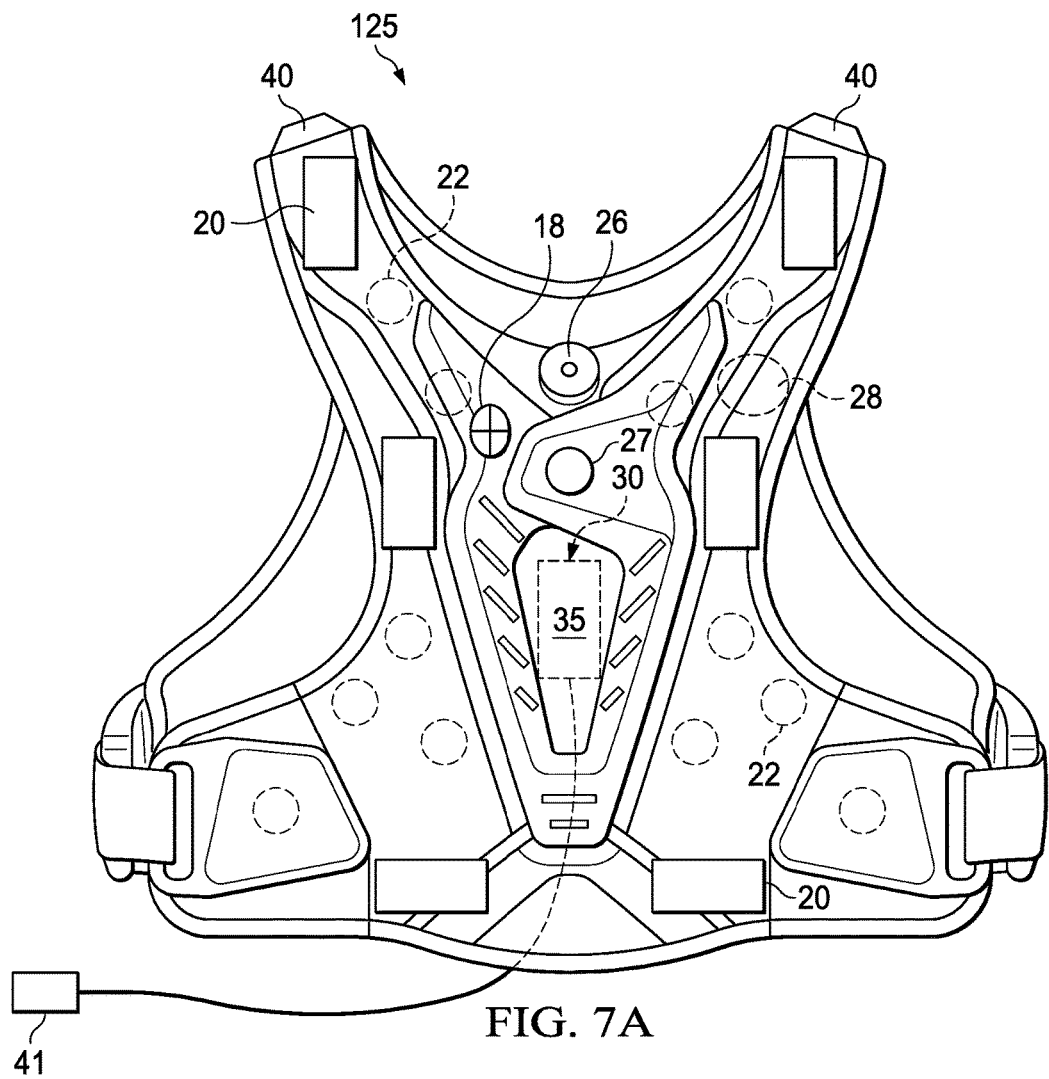
FIG. 7A is a front view of one of the types of wearable garment disclosed herein.

FIG. 7A is a front view of one of the types of wearable garment disclosed herein. In this instance, FIG. 7A shows a pair of lacrosse pads 125 worn on the upper torso of player 100 similarly to that of football shoulder pads 10. Lacrosse pads 125 are designed to protect player 100's torso, but are not as thick as those typically worn by football players. Nonetheless, lacrosse is a collision sport. Thus, system 1 is apropos for its use in lacrosse.

Lacrosse pads 125 may comprise touch sensitive pads 20, RFID tags 22, one or more feedback devices such as such as buzzer 26, light 27 and/or a vibrator 28. Of course, two or more of the feedback devices may be present and built into shoulder pads 10. Such feedback devices provide acknowledgment of having been contacted by an opposing player 100, such contact being counted as, for example, a tackle.

Also present either on or within shoulder pads 10 is module housing 30. Module housing 30 herein is similar to that for gloves 15. It contains the electronic architecture previously described; i.e., controller module 35, wireless module 36, a data collection module, a and data transmission device.

Figure 7B:
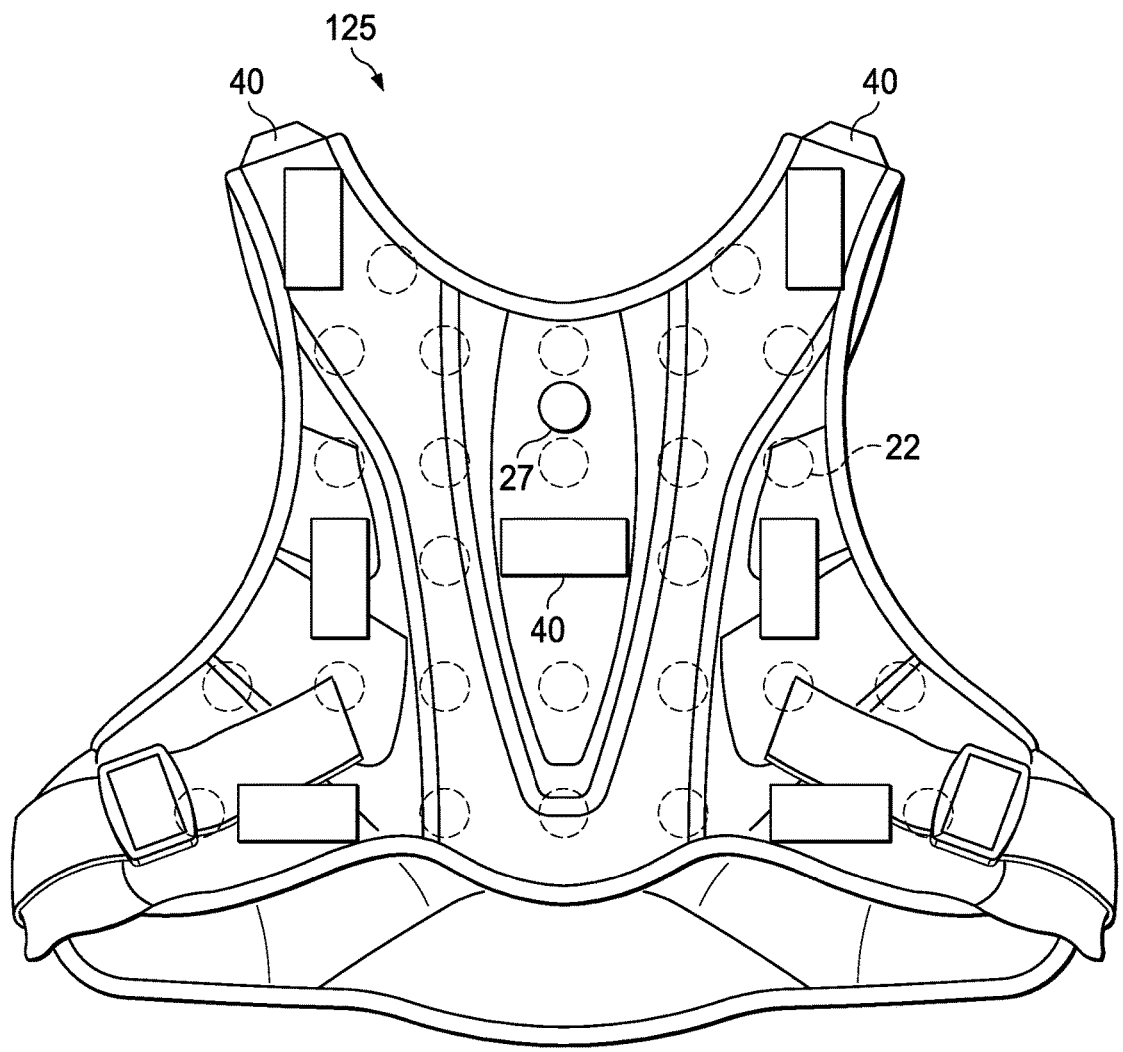
FIG. 7B is a back view of one of the types of the wearable garment of FIG. 7A.

FIG. 7B is a back view of one of the types of lacrosse pads 125 of FIG. 7A. Touch sensitive pads 20 and RFID tags 22 are also shown dispersed about the back of lacrosse pads 125. Also shown is hook & loop wiring 40 that creates an electrical signal between jersey 110 (when used herein as part of system 1) and lacrosse pads 125 for touch sensitive pads 20.

Figure 8:
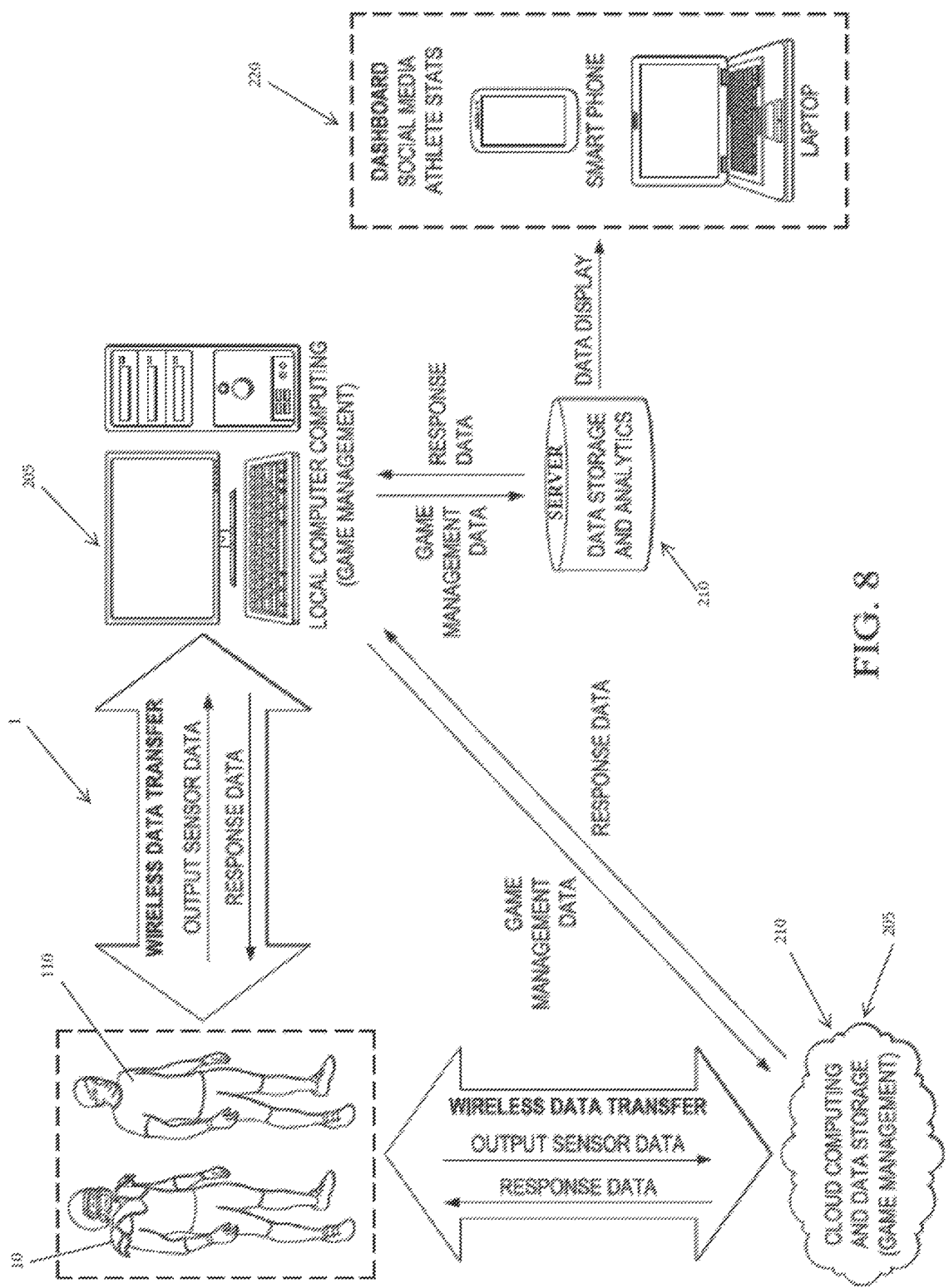
FIG. 8 is a schematic view of the system.

FIG. 8 is a schematic view of system 1. Sports players generate data based upon their interactions during game play. Such data generation occurs through wear of football gloves 15, shoulder pads 10 and/or jersey 110. Through all of the interactions thereof described hereinabove data is produced through game play. Once created, the data is then immediately transmitted to either a game management system 205 and/or to storage medium 210. Transferred data is then stored, preferably, off-site from the field of play upon which data is generated by system 1.

Game management system 205 is responsible for immediately organizing the data based upon operator pre-sets. Examples of such pre-sets include, but are not limited to, tackle events, turnover events, catches, yards thrown, yards run, and more. Also, game management system 205 operates to provide game play and analytic insights in real time, if desired, or post-game play analytic capability.

Game management system 205 may create new data through its use of analytics and/or use of algorithms positioned onto game management system 205 or algorithms otherwise accessible thereto. Such newly created data is accessible to storage medium 210 on a rolling basis or on-demand thereby.

Storage medium 210 can be one of several types. Ideally, generated data during game play is wirelessly transmitted to storage medium 210. Persons of skill in the art will recognize that generated data during game play can occur non-wirelessly. While possible, such transfer is not immediate nor as efficient as wireless transfer, particularly during game play. Nonetheless, the ability to transfer data in a non-wireless manner is possible. In environments in which wireless transfer is not possible, non-wireless transfer may be used to move data from the field during game play to either game management system 205 or storage medium 210.

Data transferred to either game management system 205 or to storage medium 210 may be analyzed and/or treated analytically by statistical analysis medium 215. Statistical analysis medium may comprise a separate device or may be included within either game management system 205 or storage medium 210. Importantly, such statistical analysis occurs by one or more algorithms (not shown) loaded onto a server-grade computer or server. The algorithms treat all, or almost all, received data statistically in order to produce new insights not immediately apparent from the data in an untreated condition.

Finally, output device 220 receives generated data, treated or non-treated. Such data informs the user of output device 220 according to pre-sets and/or selected data outputs. For example, a user can access tackling data, location of tackling data, player yardage data and nearly any kind of information creatable by use of system 1. Output device 220 can be any of a number devices useful for communication. For example, output device 220 can be a pad device, laptop computer, desktop computer, hand held mobile device (e.g., IPHONE®, ANDROID®), or any device known by persons of skill in the art useful for communicating data acquired, created, or transformed herein whether visual, auditory or both.

All of the components noted hereinabove are useful for system 1. By their use, data is collected in a manner not done before now. Such data comes directly from game play in American football or other well known sports in which collisions are either intentional or commonplace. Their integration enables robust, real-time data acquisition and treatment that is deliverable to users and operators of system 1.

Figure 9:
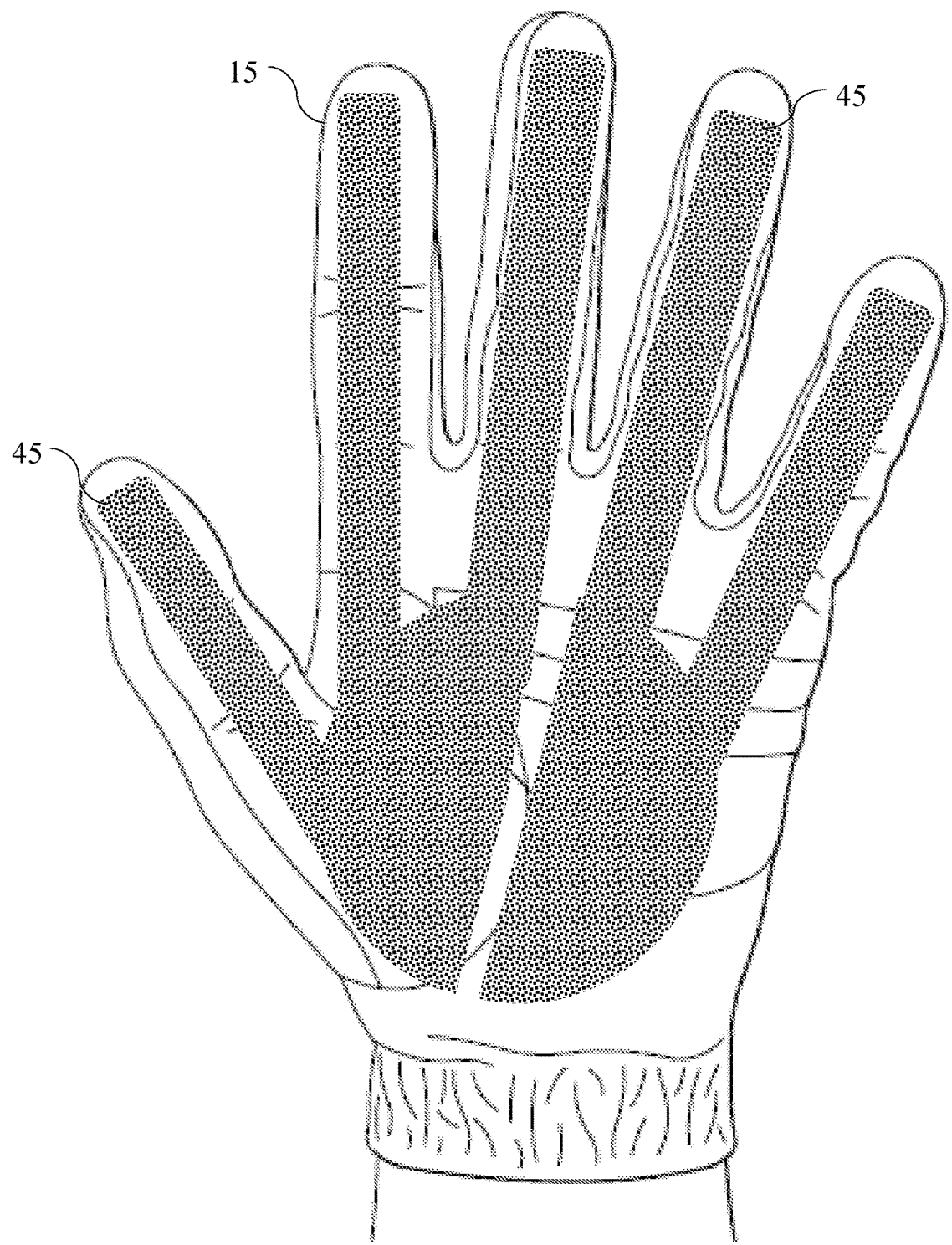
FIG. 9 is a planar view of the palm of a hand device embodiment herein.

FIG. 9 is a planar view of the palm of a hand device embodiment herein. Specifically, an alternative embodiment of glove 15 is shown. Herein, the palm side of glove 15 is made of or mounted with first conductive fabric 45. Jersey 110 possesses a second conductive fabric 46 (shown in FIG. 11). First conductive fabric 45 and the second conductive fabric 46 are two separate conductive fabric circuits. When first conductive fabric 45 of glove 15 contacts the second conductive fabric 46 of jersey 110, a circuit is completed. Once a circuit is completed, one or more of the present feedback devices on either glove 15 or jersey 110 activate.

As well noted hereinabove, a feedback device herein may comprise either buzzer 26, light 27, a vibrator 28 or some combination thereof. At completion of the circuit between first conductive fabric 45 and the second conductive fabric 46, feedback from a feedback device is rendered instantaneously. Additionally, once the circuit is completed, data created thereby is sent to a data receiving device and to the rest of system 1 for data analysis. Such data is preferably transmitted wirelessly via wireless module 36 (FIG. 4A).

The embodiment of FIG. 9 is a dual circuit activation embodiment. There is one type of conductive fabric present on the palm of glove 15. As shown, two or more regions of conductive fabric—i.e., first conductive fabric 45—are provided. As such, both regions of first conductive fabric 45 must touch the second conductive fabric 46 on jersey 110 in order for the circuit to be complete.

In practice, a complete circuit between glove 15 and jersey 110 must be made to activate one or more of the feedback devices. To effect such activation, one first conductive fabric 45 on glove 15 must touch second conductive fabric 46 on jersey 110. The other first conductive fabric 45 on glove 15 must touch second conductive fabric 46 on jersey 110. To be clear, either of the first conductive fabrics 45 may be used to complete the circuit between glove 15 and jersey 110. The use of both first conductive fabrics 45 on glove 15 completes a full circuit therebetween jersey 110 thereby activating feedback devices on jersey 110 and glove 15.

Figure 10:
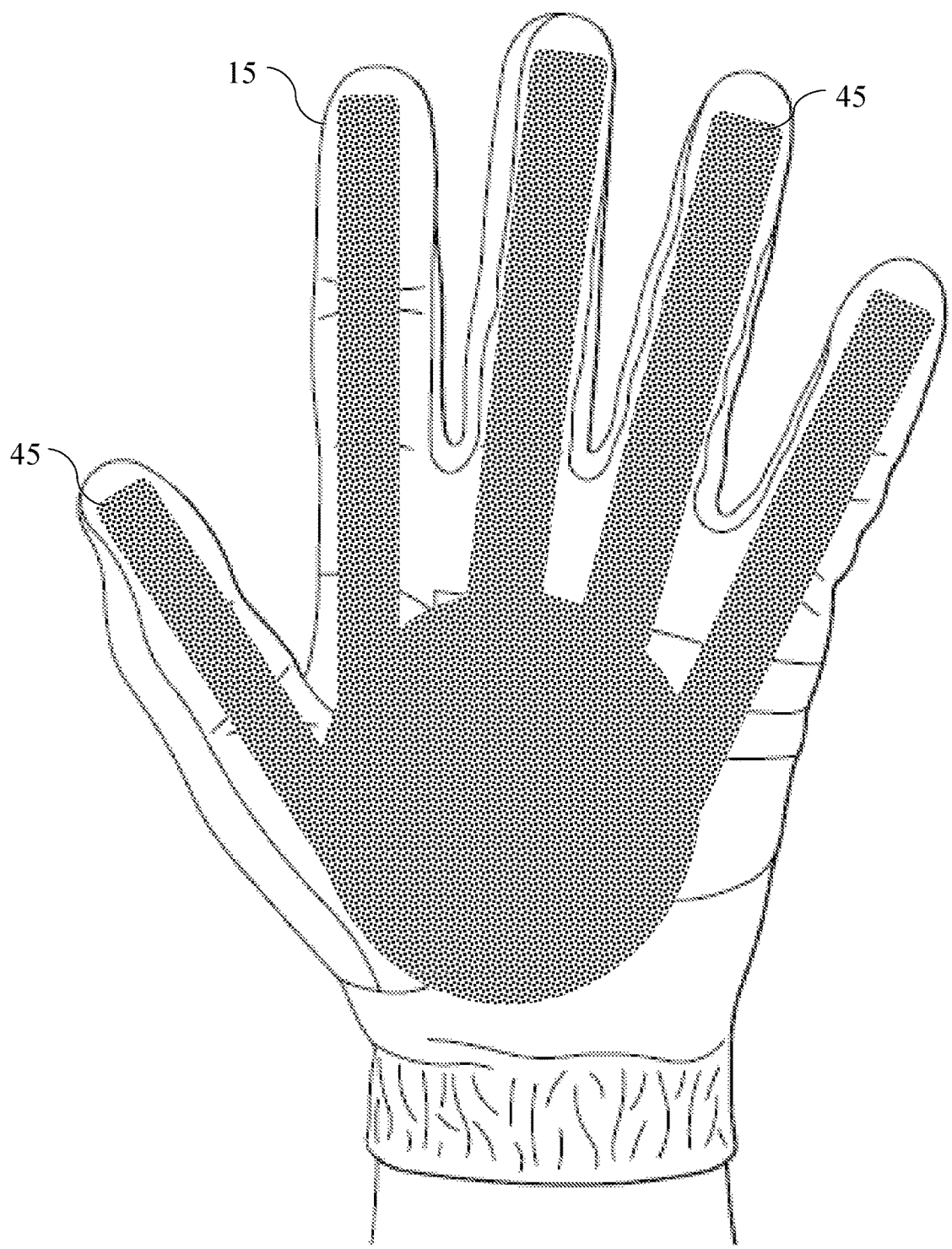
FIG. 10 is a planar view of the palm of another hand device embodiment herein.

FIG. 10 is a planar view of the palm of another hand device embodiment herein. This embodiment comprises glove 15 for use in a single circuit activation execution. The palm side of glove 15 is made of or mounted with first conductive fabric 45. Jersey 110 possesses a second conductive fabric 46 (shown in FIG. 11). First conductive fabric 45 and second conductive fabric 46 are two separate conductive fabric circuits. When first conductive fabric 45 of glove 15 contacts second conductive fabric 46 of jersey 110, a circuit is completed. Once a circuit is completed, one or more of the present feedback devices on glove 15 or jersey 110 activate.

In practice, glove 15 contacts second conductive fabric 46 on jersey 110. At such touching, a circuit is completed. At completion of the circuit between first conductive fabric 45 and second conductive fabric 46, feedback from a feedback device is rendered instantaneously. Additionally, once the circuit is completed, data created thereby is sent to data receiving device and to the rest of system 1 for data analysis. Such data is preferably transmitted wirelessly via wireless module 36 (FIG. 4A).

Figure 11:
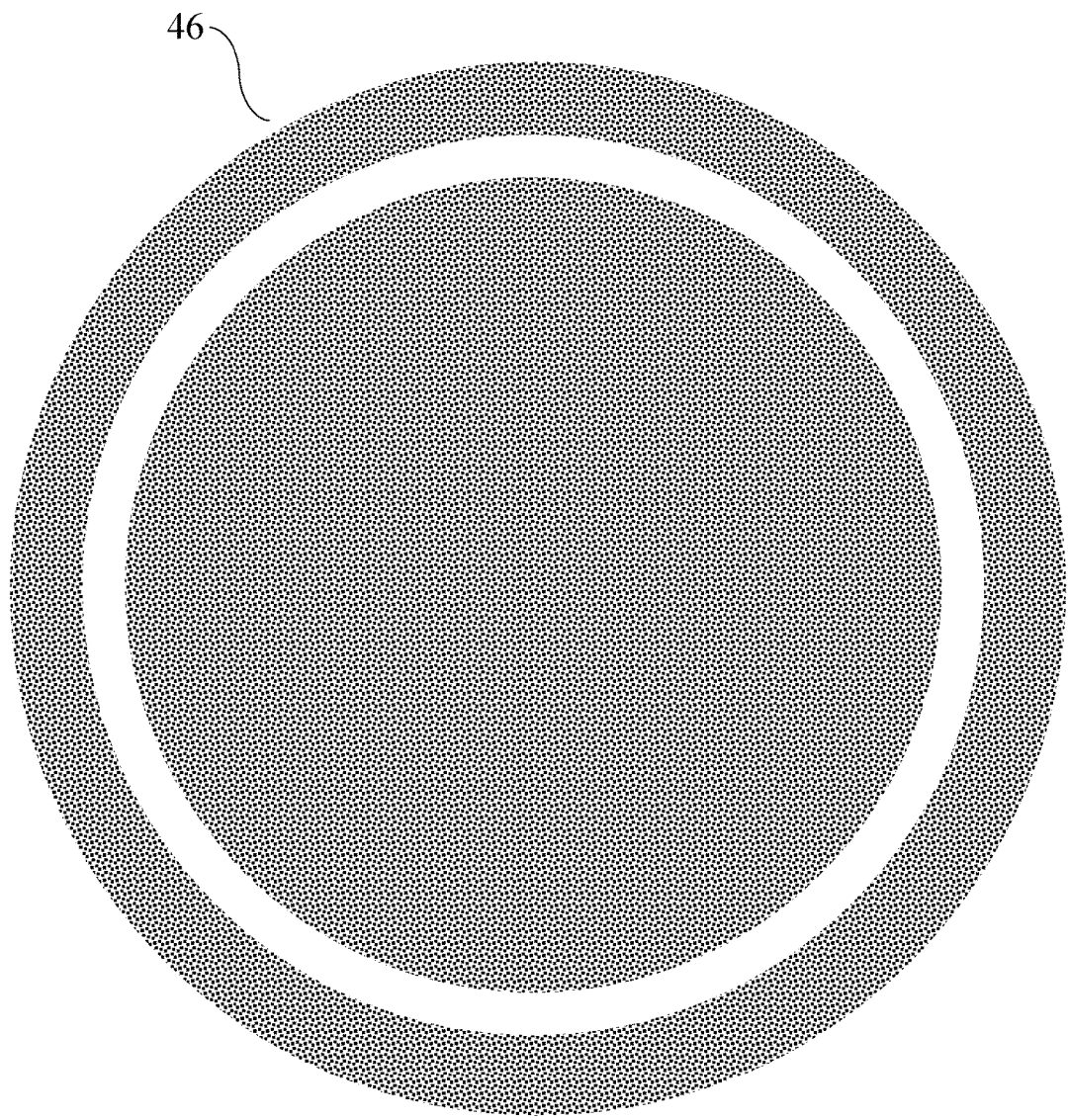
FIG. 11 is a planar view of an operative element for use on a jersey herein.

FIG. 11 is a planar view of an operative element for use on a jersey 110. The operative element is a second conductive fabric 46 thereon. It is the necessary mate to first conductive fabric 45 to complete the circuit between these two elements. Second conductive fabric 46 can be made into any shape including the oval shown herein. Second conductive fabric 46 may be used throughout jersey 110 as little or as much as a designer deems necessary. Also, second conductive fabric 46 may be multi-sized from as a little as an inch or less across to as large as several inches. The size of second conductive fabric 46 depends upon a designer's objectives. Persons of skill in the art will readily recognize that their sizing of second conductive fabric 46 depends substantially upon design criteria and game design.

Example 1—American Football

In this example, players are assembled for a game of American football. Ideally, the players are dressed as normal football players who expect to engage in contact would be dressed. They wear shoulder pads, thigh pads, helmets and gloves. The exception here is that while contact occurs and is encouraged, intentional collisions do not occur.

Tackles are registered by contact of the hands in gloves 15 of system 1 herein to jersey 110 and/or shoulder pads 10 herein. When a defensive player seeks to tackle an offensive player, the defensive player must touch or contact the player who is holding and, presumably, moving with the football.

Such contact can be programmed to require a threshold of force and/or time in order for a tackle to be registered. For example, in a youth game, force of contact may be programmed to require, for example, less than ten pounds of force applied from gloves 15 to jersey 110. Also, the length of time that gloves 15 must be in contact with jersey 110 (or another part of player's equipment properly equipped for use within system 1) can be programmed depending upon level of play; e.g., one second or less for youth play or a five or more seconds for professional play. Such programming is possible within system 1 and is at the discretion of the organizers, coaches or league owners of this form of non-collision football.

Example 2—Youth American Football

In this example, a youth football league exists in which ten or more teams engage in American style football and according to its rules. Parents have specifically signed their children up (boys and girls) to learn and play football in this league.

This league is renowned for teaching the critical fundamentals of football while substantially removing the occurrence of intentional collisions. As a result, the percentage of injuries per team is dramatically reduced in comparison to other nearby youth football leagues.

The players in this league wear all of the same equipment as in known, American football (i.e., helmets, shoulder pads, thigh pads, and the like) but also don gloves 15 and shoulder pads 10 that are configured to operate digitally within system 1. That is, gloves 15 and shoulder pads contain the electronic architecture noted hereinabove that enables their use in system 1.

For youth football, system 1 can be programmed so that the game is easier to play. For example, a tackle may be programmed to be by contact of one glove 15 to jersey 110 for less than three seconds. Such contact is registered either by one or more touch sensitive pads 20 located in jersey 110 being touched. Or, contact is registered due to RFID reader 23 and RFID antenna 24 reading in glove 15 and recognizing RFID tags 22 in jersey 110 as glove 15 touches jersey 110.

System 1 can also be programmed so that only one glove 15 is required to effect a tackle. This would be particularly critical for participants of the game who are smaller and younger. In this instance, the game can be near fully accessed and learned for youth players without the concern for intentional collisions that would occur.

Importantly, the youth players are outfitted in all of the regular gear that they would wear for collision-based football because this teaches them how to later play the more traditional game having learned to do so in standard, traditional football equipment. This overcomes the problem that flag or touch football creates when young players (i.e., pre-high school) attempt to move from these non-collision forms of football to actual collision based football in high school and college.

Example 3—Youth American Football—No Pads Example

In this example, as in EXAMPLE 2, a youth football league exists in which ten or more teams engage in American style football and according to its rules. Parents have specifically signed their children up (boys and girls) to learn and play football in this league.

This league is renowned for teaching the critical fundamentals of football while substantially removing the occurrence of intentional collisions. As a result, the percentage of injuries per team is dramatically reduced in comparison to other nearby youth football leagues.

Differently than in EXAMPLE 2, players in this league do not wear shoulder pads, a football girdle, thigh pads or, optionally, a helmet. System 1 is fully employed herein via the gloves 15 and jersey 110. Tackles are recorded by touch of gloves 15 to jersey 110. Tackles may be calibrated for relatively mild touches of glove 15 to jersey 110 or for harder touches. For example, if system 1 is employable herein for four and five year old players, system 1 would be calibrated to record tackles of either the one or two hand variety at very low force of contact between glove 15 and jersey 110. For higher aged children (e.g., ten to twelve year olds), system 1 would be calibrated to require that all tackles include both gloves 15 at higher contact forces to jersey 110 and that gloves 15 be applied to jersey 110 at substantially the same time, and for a certain amount of time, in order to record a tackle.

In play, youth players are unencumbered by bulky equipment. Also, the game looks and feels like a game of touch football instead of collision based tackle football. System 1 enables measurable results of this game; i.e., tackles, ball possession, yardage gained, yardage lost, and the like.

Jersey 110 is configured to provide noticeable and obvious feedback to players and officials during game play. Tackles may be felt due to buzzer 26 of feedback device 25. They can be seen due to one or more lights 27 that emit a signal once a tackle, according to pre-calibrated selection by an operator, occurs.

While not required in this example of the use of system 1, a league operator may opt to require use of a traditional American football helmet. Such use might occur in order to mitigate against the happening of inadvertent collisions or falls by players. Wear of helmets herein may also occur to instill a sense of shared purpose amongst youth players to traditional, collision based American football.

Example 4—Adult Football

For purposes of the disclosure herein, "adult football" is defined herein American style football of type played in high school, college, the NFL® and in other professional football leagues.

The players in this league wear all of the same equipment as in known, collision-based American football (i.e., helmets, shoulder pads, thigh pads, and the like) but also don gloves 15 and shoulder pads 10 that are configured to operate digitally within system 1. That is, gloves 15 and shoulder pads contain the electronic architecture noted hereinabove that enables their use in system 1.

For adult football, system 1 can be programmed so that the level of difficulty of the game play is high. For example, a tackle may be programmed to be by contact of two gloves 15 to jersey 110 for three seconds or more to simulate the actual time of collision and contact of one player tackling another. Such contact is registered either by one or more touch sensitive pads 20 located in jersey 110 being touched. Or, contact is registered due to RFID reader 23 and RFID antenna 24 reading in glove 15 and recognizing RFID tags 22 in jersey 110 as glove 15 touches jersey 110. Possibly, both touch sensitive pads 20 and RFID components may both be used to capture tackling within system 1.

System 1 can also be programmed so that only one glove 15 is required to affect a tackle. One glove tackling may, for example, be more suitable for high school play than for college or professional play. System 1 is programmable. Further, system 1 is selectable. For example, a user of system 1 (i.e., a league director) can select a 'one glove tackle' option through the interface by which system 1 is accessed. Similarly, system 1 can be programmed to enable two glove tackling to more greatly simulate the level of pay in college and professional play.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for playing non-collision football, comprising:
   a. A hand device fitted to the hand of a first player, said hand device having,
      i. at least one touch sensitive pad, said at least one touch sensitive pad comprising at least two first conductive fabrics, said at least two first conductive fabrics forming a dual activation zone;
      ii. a data collection module; and
      iii. a data transmission device;
   b. A wearable garment fitted to a second player, said wearable garment having,
      i. at least one touch sensitive pad, said at least one touch sensitive pad comprising a second conductive fabric;
      ii. a data collection module; and
      iii. a data transmission device;
   c. A computer configured to receive data collected by said hand device and said wearable garment;
   d. A server connectable to said computer; and
   e. At least one algorithm executed by said server, said at least one algorithm manipulating and interpreting said data collected by said hand device and said wearable garment;
   said dual activation zone of said hand device and said second conductive fabric of said wearable garment completing a circuit when both said at least two first conductive fabrics of said dual activation zone contact said second conductive fabric, said contact being registerable as a tackle.

2. The system of claim 1, wherein said wearable garment further comprises at least one feedback device, said feedback device producing a feedback response including light, sound, vibration or a combination of said light, sound or vibration.

3. The system for claim 1, wherein said hand device is a glove constructed to fit about the hand of said first player, said first player wearing at least one said glove.

4. The system of claim 1, wherein said hand device comprises at least five to at least twenty touch sensitive pads.

5. The system of claim 1, wherein said data transmission device transmits said data through a wireless connection.

6. The system of claim 1, wherein said data transmission device transmits said data through a local area network.

7. The system of claim 1, wherein said data collection module is directly connected to said data transmission device.

8. The system of claim 1, wherein said computer is connectable to said server by wireless connection.

9. The system of claim 1, wherein said computer is connectable to said server by wired connection.

10. The system of 1, wherein said computer is connectable to said server.

11. A system for playing non-collision football, comprising:
    a. A hand device fitted to the hand of a first player, said hand device having,
       i. at least one touch sensitive pad, said at least one touch sensitive pad comprising at least two first conductive fabrics, said at least two first conductive fabrics forming a dual activation zone;
       ii. at least one feedback device operatively attached to said hand device;
       iii. a data collection module; and
       iv. a data transmission device;
    b. A wearable garment fitted to a second player, said wearable garment having,
       i. at least one touch sensitive pad, said at least one touch sensitive pad comprising a second conductive fabric;
       ii. at least one feedback device operatively attached to said wearable garment;
       iii. a data collection module; and
       iv. a data transmission device;
    c. A computer configured to receive data collected by said hand device and said wearable garment;
    d. At least one feedback device providing feedback when said dual activation zone contacts said second conductive fabric to complete a circuit;
    e. A server connectable to said computer; and
    f. At least one algorithm executed by said server, said at least one algorithm manipulating and interpreting said data collected by said hand device and said wearable garment;
    said dual activation zone of said hand device and said second conductive fabric of said wearable garment completing a circuit when both said at least two first conductive fabrics of said dual activation zone contact said second conductive fabric of said wearable garment, said contact being registerable as a tackle.

12. The system for claim 11, wherein said hand device is a glove constructed to fit about the hand of said first player, said first player wearing at least one said glove.

13. The system of claim 11, wherein said hand device comprises at least five touch sensitive pads to at least twenty touch sensitive pads.

14. The system of claim 11, wherein said data transmission device transmits said data through a wireless connection.

15. The system of claim 11, wherein said data transmission device transmits said data through a local area network.

16. The system of claim 11, wherein said data collection module is directly connected to said data transmission device.

17. The system of claim 11, wherein said computer is connectable to said server by wireless connection.

18. The system of claim 11, wherein said computer is connectable to said server by wired connection.

19. The system of claim 11, wherein said computer is connectable to said server.

* * * * *